Patented Oct. 20, 1936

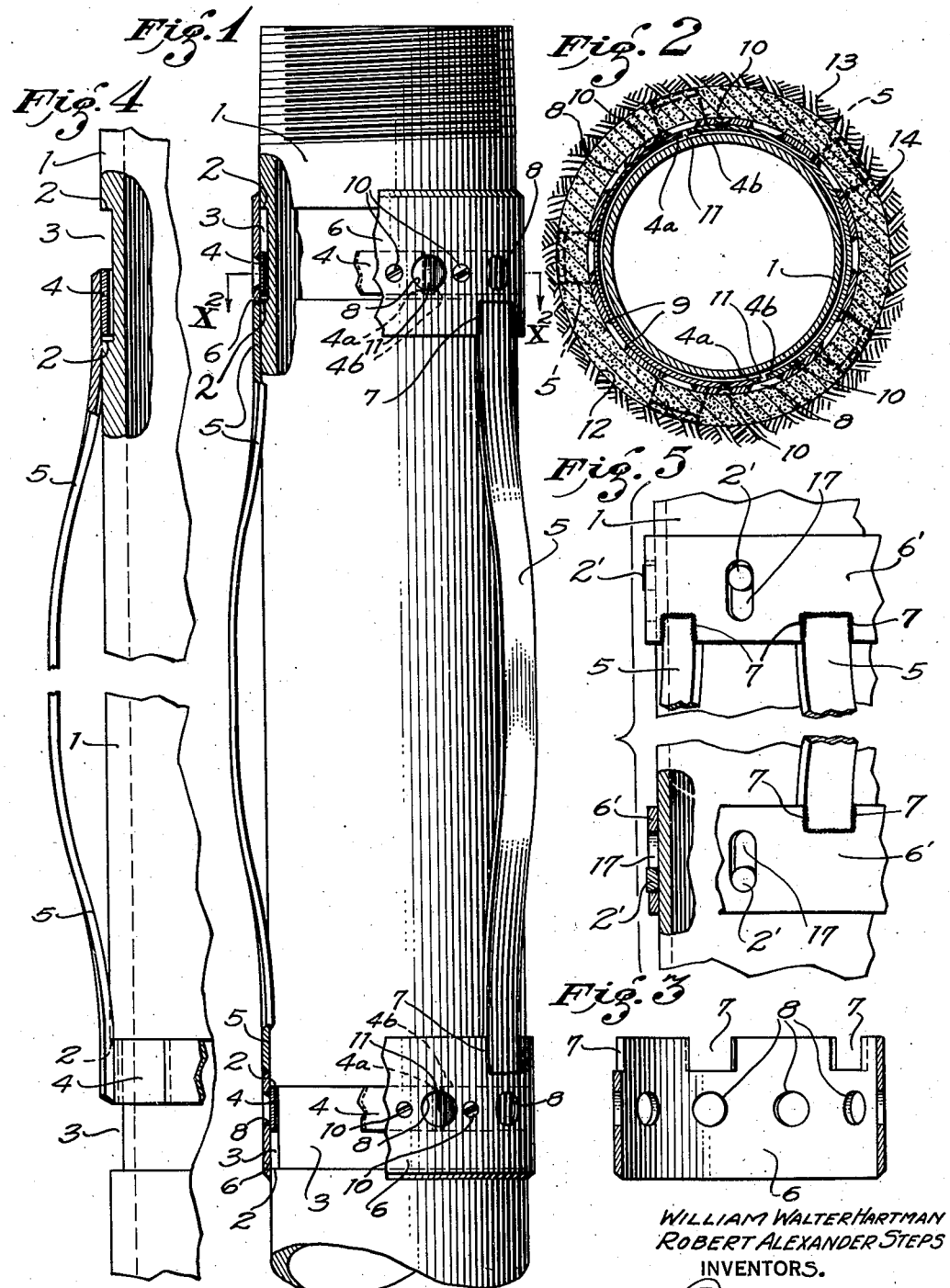

2,058,310

UNITED STATES PATENT OFFICE 2,058,310

CASING CENTERING DEVICE

William Walter Hartman and Robert Alexander Steps, Los Angeles, Calif.

Original application October 9, 1935, Serial No. 44,200. Divided and this application August 24, 1936, Serial No. 97,612

1 Claim. (Cl. 166—1)

This invention relates to centering devices used in connection with casing or pipe for centering same either in a larger casing or in a hole or well for any purpose whatever; but in particular this invention is useful for centering such pipe in wells for the purpose of insuring a uniformly thick layer of cement around the outside of the pipe where certain strata are cemented off, as is common in oil, gas, or water wells.

This invention is especially useful where the clearance is very restricted between the pipe to be centered and the hole or other pipe or casing in which it is located, or through which it passes.

The essence of this invention can be embraced in various forms or modifications, some of which we will illustrate in the accompanying drawing, along with our preferred embodiment.

This invention, however, is not limited to the details or forms herein specifically shown or described, nor is it limited in any other manner except by the broad terms of the claim appended hereto.

In the various figures like parts are designated by like numerals.

Fig. 1 is a front view of the preferred form of our invention, certain parts being broken away, and others shown in section, for purposes of clearness. Fig. 2 is a cross section of the device shown in Fig. 1, the section being taken along line X²—X² of Fig. 1, and earth formation and cement being shown around the device in the manner in which these occur when the device is cemented in place in wells. Fig. 3 is a cross section of the cylindrical end member or collar of the device shown in Fig. 1. Fig. 4 is a partial view, partly in section, of a modified form of this invention. Fig. 5 is a similar partial view, partly in section, of another modification of this invention.

In the figures the pipe to be centered is designated by reference numeral 1, and this pipe is arranged with stops, these stops in Figs. 1 and 4 being the adjacent ends 2 of the two annular grooves 3 formed in the outside surface of the pipe, and in Fig. 5 these stops are the two lugs 2' projecting outward from pipe 1.

In Figs. 1 and 4 there are stop rings 4 located in the grooves 3 and these stop rings have connection with the plurality of outwardly bowed springs 5, this connection being direct in Fig. 4, where the springs are directly fastened or welded to the stop rings 4, and being somewhat indirect in Fig. 1, because the springs are first fastened or welded to the cylindrical collars 6, which collars or members are then fastened to the stop rings 4, the details of which fastening will be more particularly described later. In other words, in Fig. 1 the springs 5 have connection with the stop rings 4 through the cylindrical end members or collars 6. To permit ready attachment of springs 5 to cylindrical end members 6, within minimum radial space, we notch the adjacent perimeters of members 6 as indicated at 7, Fig. 3, these notches being formed to nicely receive the ends of springs 5, so that these spring ends can be securely welded to members 6 at the place where they contact notches 7.

In Fig. 1 it will be noticed that the cylindrical collars 6 embrace the outside of the pipe and completely cover the annular grooves 3, in which are located the stop rings 4. Since the stop rings 4 either are an integral part of the cylindrical end members 6 or else are rigidly fastened thereto, it is apparent that special provision for assembly of same on the pipe must be made. If the stop ring 4 and cylindrical member 6 were one integral piece, one mode of installation would be to split the same longitudinally to permit it to be sprung or slipped over the pipe and then the split welded together after the collar and stop ring are in place on the pipe and in the groove; but in preference to this we provide cylindrical member 6 as one piece, with a plurality of large holes 8 therein, and we split the stop rings 4 into two parts, 4ª and 4ᵇ, and then after putting these semi-circular segments of the stop ring into grooves 3 and passing members 6 over them, the stop ring parts 4ª and 4ᵇ can be permanently fastened to member 6 by welding them together all around the periphery of each hole 8, the nature of such welding being indicated by reference numeral 9 in Fig. 2. To aid in holding the segments 4ª and 4ᵇ in proper relation with member 6 while welding, accurately placed screws 10, see Figs. 1 and 2, are provided, there being two such screws in each segment, preferably near the severing slots 11. Other means of assembling the stop rings 4 and collar 6, with reference to the pipe and groove 3 can be arranged, but the arrangement just described works satisfactorily in practice.

It is understood, of course, that stop rings 4, in Figs. 1 and 4, are free to rotate and to move slightly lengthwise in grooves 3. Also collars 6, Fig. 1, being fastened to the stop rings 4, are also free to rotate and move lengthwise of the pipe. There is preferably no limit to the rotational freedom of the stop rings and collars on the pipe, but the lengthwise motion is limited by stops 2 of the pipe coming in contact with stop rings 4 in grooves 3.

In the form of the invention shown in Fig. 4, part 4 may be designated both as a cylindrical end member and as a stop ring, because it serves the function of both; and in the form shown in Fig. 1, part 4 may be considered either as a separate element or as a part of cylindrical member 6 to which it is fastened.

In the form of the invention shown in Fig. 5 the cylindrical end members or collars 6' have slots 17 in which the stops 2' of the pipe lie.

In the forms of the invention shown in Figs. 1, 4 and 5 the two spaced stops 2 or 2' are so located with respect to the adjacent cylindrical end members that when the pipe is moved lengthwise in either direction, one or the other of the stops 2 or 2' butt against its adjacent cylindrical end member to always pull the entire centralizing device forward with the pipe. In Figs. 1 and 4 the stops 2 obviously butt against the adjacent periphery of the stop rings 4, and in Fig. 5 the stops 2' butt against the adjacent ends of slots 17. The slots 17 in Fig. 5, and the grooves 3 in Figs. 1 and 4 are long enough to permit the springs to fold flat against the pipe when the centralizing device is being pulled forward through any restricted opening, such pulling being always effected by one or the other of stops 2 or 2'. By always pulling the centralizer forward by means of the aforesaid stops, and by never pushing the centralizer from the rear, it follows that springs 5 will always flatten nicely against the pipe in passing through a close restricted hole, and that these springs will never bulge or spear outward into the formation to crush themselves, as they often would do if the device were pushed from the rear into a restricted opening.

The arrangement of parts shown in the various drawing lends itself to the production of a strong, practical, efficient centralizer within minimum radial distance from the center of the pipe, thereby making this invention particularly useful in cases where there is very limited clearance between pipe 1 and the hole or larger pipe or casing through which it is to pass, or in which it is to be located for cementing or other purpose.

In Fig. 2 the centralizer is shown in position in hole 12 drilled into the earth formation 13, cement 14 being shown completely surrounding and embedding pipe 1 and centralizer springs 5, etc. The springs 5 hold the pipe nicely centered in the well or hole 12 and consequently when the cement is flowed into place it produces a uniform wall or thickness of the cement 14 all around pipe 1. If no centralizer were used, the pipe would probably lean to one side of hole 12, and the cement would be thin on one side and thick on the other, making it subject to easy fracture on the thin side. In an oil or gas well this would permit water to seep down into the oil or gas formations, resulting in an unsatisfactory or "wet" job. The use of the centralizer prevents this.

In the form of the invention shown in Figs. 1 and 4 the casing 1 can rotate freely in the centralizer. Consequently in lowering the casing into the well the springs 5 will not rotate and scrape or cut the formation, even though casing 1 be rotated in the process. This is an advantage. The form of the invention shown in Fig. 5 does not possess this advantage, because the centralizer with its springs, etc., will rotate with the pipe, this being due to the location of the stops 2' in the slots 17.

The modification of the invention shown in Fig. 5 differs from that shown in Fig. 1 only in this, that the former uses slots 17 in the cylindrical end members, and stops 2' of the pipe, instead of the annular grooves 3, stop shoulders 2 and ring 4, as a means of limiting the movement of the device on the pipe or casing 1. The springs 5 in Fig. 5 are fastened to the cylindrical end members in the same manner as these parts are fastened together in Fig. 1, i. e., we prefer to fasten the spring ends to the cylindrical end members by welding along the vicinity of the adjacent edges of the spring ends and notches 7, so that the inner and outer surfaces of the spring ends are approximately flush with the inner and outer surfaces of the cylindrical end members, as is noticed by comparing the inner and outer surfaces of these members as shown in section near the upper part of Fig. 1, along the left side of same. The same general effect is observed, though not so clearly, by following the outline of these members as shown in Fig. 2, the springs 5 being shown dotted in this figure. It is not essential that said surfaces be absolutely flush although the general effect is desirable.

This application is a division of our co-pending application Serial No. 44,200, filed October 9th, 1935, and subject matter of invention shown but not claimed in this application is reserved and claimed in our said co-pending application.

The invention disclosed in this application is in part an improvement of the invention covered by our former Patent No. 1,775,376, dated September 9th, 1930. In the device shown in that application the springs are not fastened to the cylindrical end members in the notches that pass entirely through the cylindrical wall of the end members, the springs in fact being free of the end members in these notches, but on the contrary the spring ends are located in grooves behind these notches in such manner that the thickness of the springs and a substantial part of the cylindrical end member is compounded to thereby make a structure comparatively thick in radial direction, and consequently not so adaptable for use in cases where clearances are very limited. In the invention shown and claimed in this application however the major portion of the fastening between the spring ends and the cylindrical end members is effected in the notches 7 that pass entirely through the wall thickness of the end members, and therefore the compounding of the thickness of the spring and end member in any substantial sense is avoided and a strong structure can be produced within relatively less radial thickness or distance beyond the surface of the pipe, making the device particularly adaptable where limited clearances are encountered, and also of general utility in other cases because increased clearance is always helpful.

We claim:

A device for centering pipe in a well, said device including two aligned hollow cylindrical end members adapted to embrace said pipe and to be slidable thereon, said end members having notches passing entirely through the wall thickness thereof and entering said end members from the respective edges of the latter that are nearest each other, and outwardly bowed springs the ends of which are located in said notches and are fastened to said end members substantially along the vicinity of the edges of said notches, said end members also having slots therein, and said pipe having a stop comprising spaced lugs fastened to said pipe and cooperating with said slots in the end members to permit limited movement of said end members lengthwise of said pipe.

WILLIAM WALTER HARTMAN.
ROBERT ALEXANDER STEPS.